(12) United States Patent
Dopf et al.

(10) Patent No.: US 8,624,464 B2
(45) Date of Patent: Jan. 7, 2014

(54) BRUSH AND BRUSH HOUSING ARRANGEMENT TO MITIGATE HYDRODYNAMIC BRUSH LIFT IN FLUID-IMMERSED ELECTRIC MOTORS

(75) Inventors: Anthony R. Dopf, Calgary (CA); Paul L. Camwell, Calgary (CA); Derek W. Logan, Calgary (CA); Timothy Neff, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 403 days.

(21) Appl. No.: 12/886,786

(22) Filed: Sep. 21, 2010

(65) Prior Publication Data

US 2011/0227447 A1  Sep. 22, 2011

Related U.S. Application Data

(63) Continuation-in-part of application No. 11/431,636, filed on May 11, 2006, now Pat. No. 7,821,178.

(60) Provisional application No. 60/682,811, filed on May 20, 2005.

(51) Int. Cl.
*H02K 13/00* (2006.01)
*H02K 5/14* (2006.01)

(52) U.S. Cl.
CPC .............. *H02K 13/006* (2013.01); *H02K 5/148* (2013.01); *H02K 5/143* (2013.01)
USPC ........... 310/248; 310/227; 310/228; 310/245; 310/247

(58) Field of Classification Search
CPC ......... H02K 5/148; H02K 5/14; H02K 5/143; H02K 13/006; H02K 13/00
USPC ......... 310/227, 228, 239, 247, 248, 251, 245, 310/242, 243
IPC .................................. H02K 13/00; H01R 39/18
See application file for complete search history.

(56) References Cited

U.S. PATENT DOCUMENTS 1,757,611 A * 5/1930 Binney .......................... 310/242
2,805,350 A * 9/1957 Anderson et al. ............. 310/228
(Continued)

FOREIGN PATENT DOCUMENTS

JP          402174533 A     7/1990

OTHER PUBLICATIONS

Grossman, M.I. et al., Elecktromashinostroenie i Elektrooborudovanie, No. 25, 1977, p. 107-110 and the English translation.

*Primary Examiner* — John K Kim
(74) *Attorney, Agent, or Firm* — Ryan A. Schneider, Esq.; Troutman Sanders LLP (57) ABSTRACT

A brush and brush housing arrangement for use with an electric brushed motor containing viscous fluid. The brush and brush housing arrangement comprises a brush housing and at least one brush. The at least one brush comprising a first end that is in contact with a rotating commutator of the motor when in use and an opposed second end. At least one open-faced channel in a surface of the brush extends from the first end to the second end. The open-faced channel provides an exit for entrained fluid from the brush and brush housing, minimizing or eliminating brush lift caused by fluid being forced between the rotating commutator and the brush. Additional pressure relief channels for allowing escape of entrained fluid may be located in the housing.

14 Claims, 9 Drawing Sheets

(56) References Cited

U.S. PATENT DOCUMENTS

| | | | | |
|---|---|---|---|---|
| 2,833,946 | A * | 5/1958 | Anderson | 310/228 |
| 3,171,050 | A * | 2/1965 | Gordon | 310/239 |
| 3,353,047 | A * | 11/1967 | Buchwald | 310/247 |
| 3,383,047 | A * | 5/1968 | Hauser | 239/206 |
| 3,784,856 | A * | 1/1974 | Preston | 310/239 |
| 3,955,113 | A * | 5/1976 | Hillyer et al. | 310/245 |
| 4,160,629 | A | 7/1979 | Hidden et al. | |
| 4,619,588 | A * | 10/1986 | Moore, III | 417/366 |
| 5,083,055 | A * | 1/1992 | Hokanson | 310/248 |
| 6,169,351 | B1 * | 1/2001 | Bohart et al. | 310/239 |
| 6,933,650 | B2 * | 8/2005 | Wang | 310/245 |
| 7,298,065 | B2 * | 11/2007 | Lau | 310/242 |
| 7,671,507 | B2 * | 3/2010 | Schach et al. | 310/242 |
| 7,821,178 | B2 * | 10/2010 | Camwell et al. | 310/239 |
| 2006/0261701 | A1 * | 11/2006 | Camwell et al. | 310/239 |
| 2006/0273685 | A1 * | 12/2006 | Wada et al. | 310/239 |
| 2009/0189478 | A1 * | 7/2009 | Wada et al. | 310/227 |
| 2011/0227447 | A1 * | 9/2011 | Dopf et al. | 310/242 |

* cited by examiner

BRUSH AND BRUSH HOUSING ARRANGEMENT TO MITIGATE HYDRODYNAMIC BRUSH LIFT IN FLUID-IMMERSED ELECTRIC MOTORS

RELATED APPLICATIONS

This application is a continuation-in-part application of U.S. Ser. No. 11/431,636 filed May 11, 2006.

TECHNICAL FIELD

This present disclosure relates to electric motors, and more particularly to electric motors that require brushes in contact with the motor's armature, particularly when the motor is run while immersed in a fluid.

BACKGROUND

Modern drilling techniques employ an increasing number of sensors in downhole tools to determine downhole conditions and parameters such as pressure, spatial orientation, temperature, gamma ray count etc. that are encountered during drilling. These sensors are usually employed in a process called 'measurement while drilling' (MWD). The data from such sensors are either transferred to a telemetry device, and thence up-hole to the surface, or are recorded in a memory device by 'logging'.

The oil and gas industry presently uses a wire (Wireline), pressure pulses (Mud Pulse—MP) or electromagnetic (EM) signals to telemeter all or part of this information to the surface in an effort to achieve near real-time data.

There is a need to control certain mechanical devices such as valves or actuators in many drilling applications and these usually employ electric motors. In such situations, the motor is required to run in a pressure-compensated housing in order to offset large external pressures (usually up to 20,000 psi). In the drilling environment these motors are generally one of two types—brushless or brushed. Both have their advantages and disadvantages—for instance brushed motors do not require sophisticated control circuits and are relatively efficient, and brushless motors have finer positional and rotational control. It is important to note that volume constraints are particularly severe in this environment, so electric motors that make optimum use of their armature coils are normally of the 3-phase variety.

A major issue to be overcome when utilizing most electric downhole motors is that they usually need to move a shaft or lever that is within the external high-pressure environment. In most cases this implies that a high-pressure seal is necessary in order to protect the motor and its associated control electronics at low pressure from ingress by the drilling fluid ('mud'). Thus the seal must withstand a pressure differential of up to 20,000 psi, often at temperatures of 150° C. to 175° C. This is known to be a point of failure and can absorb significant energy in the form of friction to ensure that the seal is robust enough to withstand the differential pressure. A common method of minimizing this problem is to immerse the motor in an oil bath and communicate the external pressure of the mud to the internal oil via a deformable membrane, such as a rubber sheath. This has the effect of reducing the pressure across the seal to a few psi, thereby requiring a less robust seal that will absorb much less energy from the power source running the motor. The pertinent design issues now involve utilizing an electric motor that can run well while being completely immersed in oil. It is for this reason that most downhole designs make use of brushless motors because they avoid the issue that brushed motors must operate with their commutators and associated brushes in continuous contact. The essential problem is that the commutator is usually rotating at between 2,000 to 6,000 revolutions per minute and at this speed the oil is dragged around by both the armature and the commutator, the latter tending to lift the brushes away as the entrained oil is dragged between them—the 'hydroplaning' effect. As soon as the brushes lose contact with the armature the current to the motor stops and power—and control—is lost. A brushless motor has advantages in this respect.

In MP telemetry applications there is a class of devices that communicate by a rotary valve mechanism that periodically produces encoded downhole pressure pulses on the order of 200 psi. These pulses are detected at the surface and are decoded in order to present the driller with MWD information in order to steer the well. These rotary valves are preferentially driven by electric gearmotors, and as the forgoing implies, they will usually be electric and brushless. Because the motors are invariably powered by primary cell batteries it is important that they are efficient. Under conventional circumstances, such as surface applications at atmospheric pressure and with no particularly onerous packaging constraints, the requirements of reliable motor control, motor efficiency and output shaft positional accuracy (in order to set the valve appropriately) are not particularly challenging. But when the downhole motor is brushless and immersed in an oil bath subject to high pressure the need for positional accuracy generally leads to a loss of efficiency, as will be explained as follows.

To achieve the optimum motor torque-speed curve in small motor downhole applications normally requires the motor speed to be typically at least 2,000 rpm. The final valve output mechanism will usually increase and decrease pressure in the mud at a rate of 0.5 to 2 bits per second. This implies that the motor must be geared down in order to match these rates, and also to generate the necessary torque applied to the valve itself so that adequately large pressure pulses can be developed. The valve mechanism in most cases needs the motor to stop and start at specific output positions so that the pressure increase and decrease is well defined according to the prevailing telemetry protocol. Thus the final mechanical valve positional outputs must be monitored, and this information communicated to the motor controller. In a brushless geared-down electric motor as described the necessary output shaft position is normally achieved by some sort of sensor, typically an encoding optical disc; the motor speed and control is by a microprocessor circuit. Both of these means utilize semiconductor components. Problematically, the semiconductors (transistors, diodes, integrated circuits etc.) must be isolated from high pressure or else they will collapse and fail. In situations where pressure must be tolerated the solution for a brushless motor is that one of the armature coils (typically one of three) is used as a sensor to determine speed and position instead of it being used to power the output shaft. This has the effect of significantly reducing the efficiency of a brushless motor. Further, a relatively complicated electronic control circuit housed in a low-pressure environment must be employed.

In summary:
the downhole valve rotary mechanism in most cases requires a rotary output shaft
this implies the beneficial use of a geared-down electric motor
in order to reduce the friction generated by the high differential pressure across the seal separating the external drilling fluid from the internal mechanisms a pressure-compensated housing is employed the fluid utilized to resist the external pressure is typically oil the electric motor running in the oil (of finite viscosity) will not suffer brush problems if the motor is brushless this implies the brushless motor's control and position circuits must be isolated from high pressure the present state of the art means of achieving brushless motor control and accurate output position employs one of the motor's armature coils this loss of typically ⅓ of the power-producing coils leads to a serious loss of system efficiency It is generally well known that if a brushed motor has to be used the brush lift can be reduced to some extent by some or all of the following means:

reduce the motor's rotational speed use oil of a lower viscosity increase the spring force pushing the brushes into the commutator modify the brush by inserting slots in its bearing surface adjacent to the commutator These conventional methods have only limited success, particularly if each parameter has been increased to its practical limit. There have been some attempts to shield the brushes by judicious use of fixed plates (see Grossman, M. I. et al., Elektromashinostroenie i Elektrooborudovanie, no. 25, 1977, p. 107-110), but this type of technique adds significant mechanical complexity and cost. In the downhole industry, present knowledge constrains downhole tool designers to utilize brushless motors in almost all downhole applications.

SUMMARY

According to one aspect of the invention, there is provided a brush and brush housing arrangement for use with an electric brushed motor containing viscous fluid. The brush and brush housing arrangement comprises a brush housing and at least one brush. The at least one brush comprises: a first end that is in contact with a rotating commutator of the motor when in use and an opposed second end; and at least one open-faced channel in a surface of the brush extending from the first end to the second end, such that the viscous fluid can be diverted from between the brush and the commutator and can exit the brush and brush housing arrangement via the open-faced channel. The brush can comprise two channels, namely, a first open-faced channel in the surface of a leading face of the brush, and a second open-faced channel in the surface of a trailing face of the brush.

The housing can include pressure relief means for allowing reduction of brush lift in the electric brushed motor. More particularly, the housing can comprise an inner surface which defines a space for receiving the commutator of the motor in the viscous fluid, an outer surface, and at least one brush-locating slot extending between the inner surface and the outer surface for receiving each of the at least one brush; the housing can further comprise at least one pressure relief channel extending between the inner surface to the outer surface of the housing, such that the viscous fluid can be diverted from between the at least one brush and the commutator and can exit the brush and brush housing arrangement via the pressure relief channel.

At least one pressure relief channel can comprise a first open-faced channel in a surface of the housing defining the at least one brush-locating slot immediately adjacent the leading face of the brush received in the brush-locating slot. The at least one pressure relief channel can further comprise a second open-faced channel in a surface of the housing defining the at least one brush-locating slot immediately adjacent the trailing face of the brush received in the brush-locating slot. The brush and brush housing arrangement can further comprise at least one additional pressure relief channel extending between the inner surface and the outer surface of the housing and spaced from the at least one brush.

According to another aspect, there is provided a brush and brush housing arrangement for use with an electric brushed motor containing viscous fluid. The brush and brush housing arrangement comprises a brush housing and at least one brush. The at least one brush comprises a first end that is in contact with a rotating commutator of the motor when in use, an opposed second end, and four side faces. At least one edge between the side faces is chamfered. The first end can include a single slot extending towards the second end; at least one edge of the slot can also be chamfered.

According to another aspect of the invention, there is provided a brush for use with an electric brushed motor containing viscous fluid. The brush and electric brushed motor are housed within a brush housing and comprise a brush and brush housing arrangement. The brush comprises: a first end that is in contact with a rotating commutator of the motor when in use and an opposed second end; and at least one open-faced channel in a surface of the brush extending from the first end to the second end, such that the viscous fluid can be diverted from between the brush and the commutator and can exit the brush and brush housing arrangement via the open-faced channel.

According to yet another aspect of the invention, there is provided a brush for use with an electric brushed motor containing viscous fluid. The brush comprises a first end that is in contact with a rotating commutator of the motor when in use, an opposed second end, and four side faces. At least one edge between the side faces is chamfered.

BRIEF DESCRIPTION OF THE DRAWINGS

In the accompanying drawings, which illustrate one or more exemplary embodiments.

DETAILED DESCRIPTION

The embodiments described below introduce a novel aspect relating to a brush and to a brush and brush housing assembly to facilitate operation of a brushed motor at high speed in oil while mitigating conventional brush lift problems.

This has the benefit that a more efficient and simple motor system can be utilized, particularly in oil and gas drilling downhole MP telemetry applications. Although the following embodiments are specifically useful for a certain class of MP systems, they can be useful in other telemetry or downhole control applications. This is demonstrated by showing the causes of brush lift in fluids of significant viscosity and undertaking a simplified analysis of hydrodynamic lift. Conventional means of offsetting the lift in our industry has been confirmed as inadequate based on research and experimentation. The following embodiments describe mitigation means in order to reduce the lift effect to negligible proportions.

The following embodiments help to overcome the deleterious and unintended effects of the brushes lifting when the electric motor is run in oil, and conventional means of stopping this effect have failed. The applications specifically apply to a class of downhole MWD tools, but the following embodiments are not limited to this scope—they apply to any brushed electric motor that suffers from brush lift due to the entrained fluid around the commutator being viscous enough to cause brush lifting (hydroplaning).

By a simplified analysis of fluid flow around a generic cylinder the underlying forces that cause brushes to lift away are demonstrated, and by extension, it is demonstrated how to reduce these forces by providing pressure relief channels. The embodiments described below are pertinent to small motors running at a few thousand rpm in light oil, but the following embodiments can be generally applied to other applications for motors in non-downhole environments.

For ease of reference, like components of the various figures are identified where possible by the same reference numbers.

Figure 1:
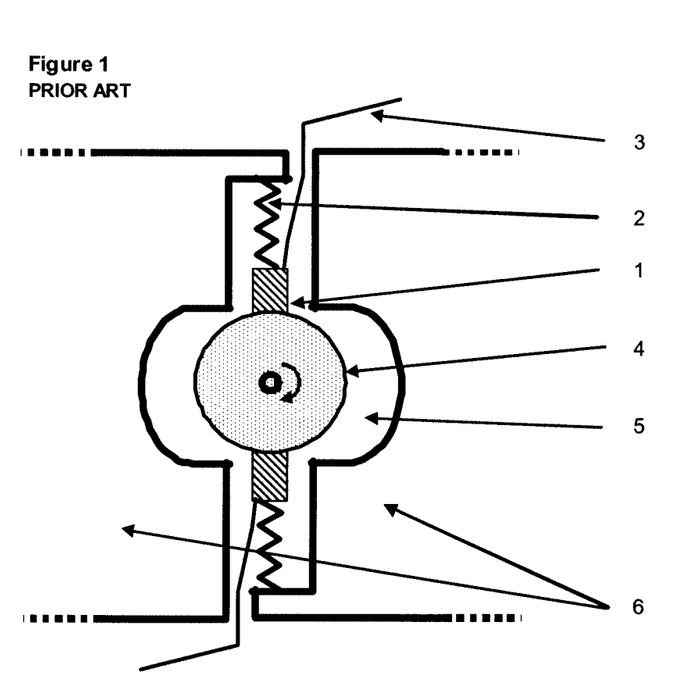
FIG. 1 is a representation of a prior art part of a simple dc motor armature with its power source comprising in part two brushes disposed around a rotating commutator in an insulating housing.

Referring to FIG. 1 (prior art), a simple dc electric motor is energized by current flowing along current conductors 3 via carbon brushes 1 and on into a commutator 4. The brushes 1 are held firmly against the commutator 4 via springs 2. The rotating parts of the motor (armature) are constrained by a mechanical housing 6 that also utilizes an oil-filled space 5 wherein the oil acts as a pressure compensation fluid. The disadvantage of allowing oil to be in close contact with the rotating parts of the motor, particularly the commutator 4, is that oil is swept around by the commutator's motion and often forces its way between brush 1 and commutator 4, thus lifting the brush 1 and causing a current interruption, to the detriment of the motor's operation.

Figure 2:
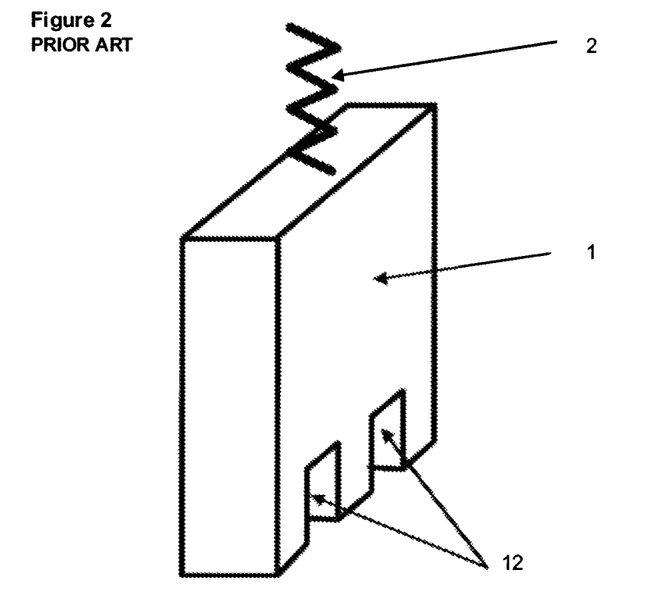
FIG. 2 illustrates a prior art brush which has been modified to incorporate slots to enable the easier passage of rotationally-entrained oil.

Referring to FIG. 2 (prior art), two simple means can be employed to mitigate the effect of the rotationally entrained oil from lifting the brush—bypass slots 12 can be cut into the brush 1 in the direction of travel, and the springs 2 that force the brush 1 against the commutator can be made stiffer. It is obvious to one skilled in the art that a further advantage can sometimes be gained by making the oil of as low a viscosity as is practical. However, it has been found that these simple means are not always effective in addressing the problem of brush lift.

Figure 3:
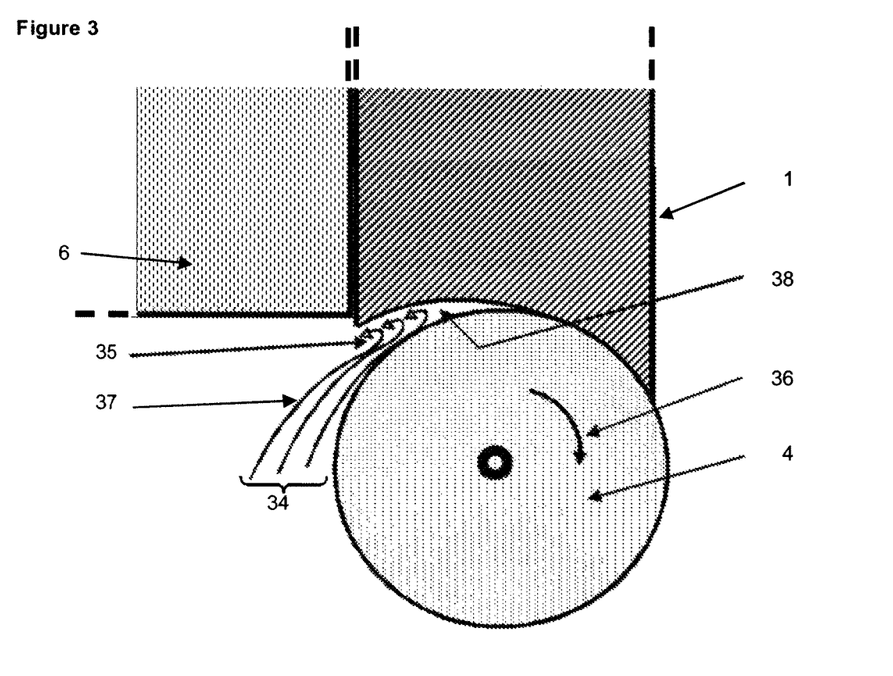
FIG. 3 illustrates how entrained oil can be swept under the leading edge of a brush, causing potential lift.

FIG. 3 illustrates an enlarged view of an area of the motor. It has been noted that the brushes 1 rarely form a profile that matches the circular shape of the commutator 4, particularly if the motor has occasion to run in the reverse direction from normal 36. This is partly a consequence of the friability of the carbon and the lack of perfect location of the brush 1 by the housing 6. The pertinent effect is that a 'pocket' or wedge 35 is formed at the leading edge of the brush 1, enabling the entrained oil 34 to dynamically collect in the available volume between brush 1 and commutator 4. It is now obvious that the wedge would deleteriously grow larger, ultimately lifting the brush 1 off the commutator 4 if the rotational speed is increased, the oil was more viscous (perhaps by lowering the temperature or allowing contamination), the spring force weakens, or a combination of all these effects.

It remains to be shown how oil being dragged in a tangential direction can provide a perpendicular force to the axis of the commutator, thereby lifting the brushes against the action of their springs. Once this is understood, means can be assessed to mitigate or reduce this force.

The following analysis breaks the problem into two parts—(1) how much entrained oil is effective in being forced against each brush, and (2) once the oil does impinge on the brush, how this translates from a tangential to a radial force. In the embodiments described herein, displacement in or reference to the "radial" direction includes displacement along a vector that is collinear with a vector extending from the center of the commutator 4, but also more generally includes displacement along a vector that has a component perpendicular to the surface of the commutator 4.

Entrained Oil:

Assume the oil flows (is dragged around) in the space 5 between the rotating commutator 4 and the stationary housing 6 (as shown in FIG. 1). The velocity of the oil will be a maximum at the surface of the commutator 4 and a minimum at the housing 6. The velocity profile (velocity v vs. distance r out from the commutator) will be governed by some relationship (see for instance Poiseuille's law, or Couette flow, described at http://hyperphysics.phy-astr.gsu.edu/hbase/pfric.html, one amongst many sources). For illustrative purposes a general exponential relationship can be reasonably determined and followed through in order to understand the major parameters that can be expected to play a role in the transport of oil around the commutator and potentially under the brushes.

Consider $$v = v_c \exp(-r/k\eta) \quad [1]$$

where
 v=velocity of the entrained oil,
 $v_c$=velocity at the outer edge of the commutator,
 r=radial distance away from the commutator,
 k=constant chosen to best fit experimental results, and
 η=oil viscosity.

Plotting v against r produces a family of curves showing that velocity v falls from a maximum velocity $v_c$ with increasing r for each given value of η. Increasing η flattens out the profile from an obvious negative exponential toward a more linear response. Equation [1] can be easily integrated to determine the average oil velocity $v_a$ out to some distance $r_a$ from the commutator. This yields:

$$v_a = (k\eta v_c / r_a)(1 - \exp(-r_a/k\eta)) \quad [2]$$

where
 $r_a$=an average distance from the commutator.
 If $r_a \gg k\eta$, then Equation [2] simplifies to:

$$v_a = k\eta v_c / r_a \quad [3]$$

Equation [3], while oversimplifying the real situation, does confirm the intuitive importance of the various parameters. For instance, the entrained rotating oil velocity at a given distance from the commutator is directly proportional to the viscosity and the commutator rotational speed, and is inversely proportional to the distance from the rotating surface of the commutator. The oil's maximum velocity matches that of the commutator when r=0, and average velocity of the oil that is forced into the wedge 35 of FIG. 3 is predicted by $v_a$ at a given $r_a$. This distance is made commensurate with the size of the wedge. One can now use Equation [3] to estimate the lifting force on the brushes.

Radial Force:

FIG. 3 shows how the oil 34 is forced into the wedge 35, follows some profile 37 and curls around under the brush 1, forming a stagnation point 38. Note that if the majority of the oil 34 forced into the wedge 35 were able to continue in the direction of the rotating commutator 36 there would be no stagnation point, simply constrained flow under the brush 1.

If we assume that oil moves towards the stagnation point at an average velocity of $v_a$, the momentum in the direction of travel has to equate to zero because the oil curls back and continues around the oil-filled space contained by the housing. Using the law of Conservation of Momentum, we can expect that the force on the oil in the wedge exactly matches that necessary to reduce the momentum to zero.

Figure 3A:
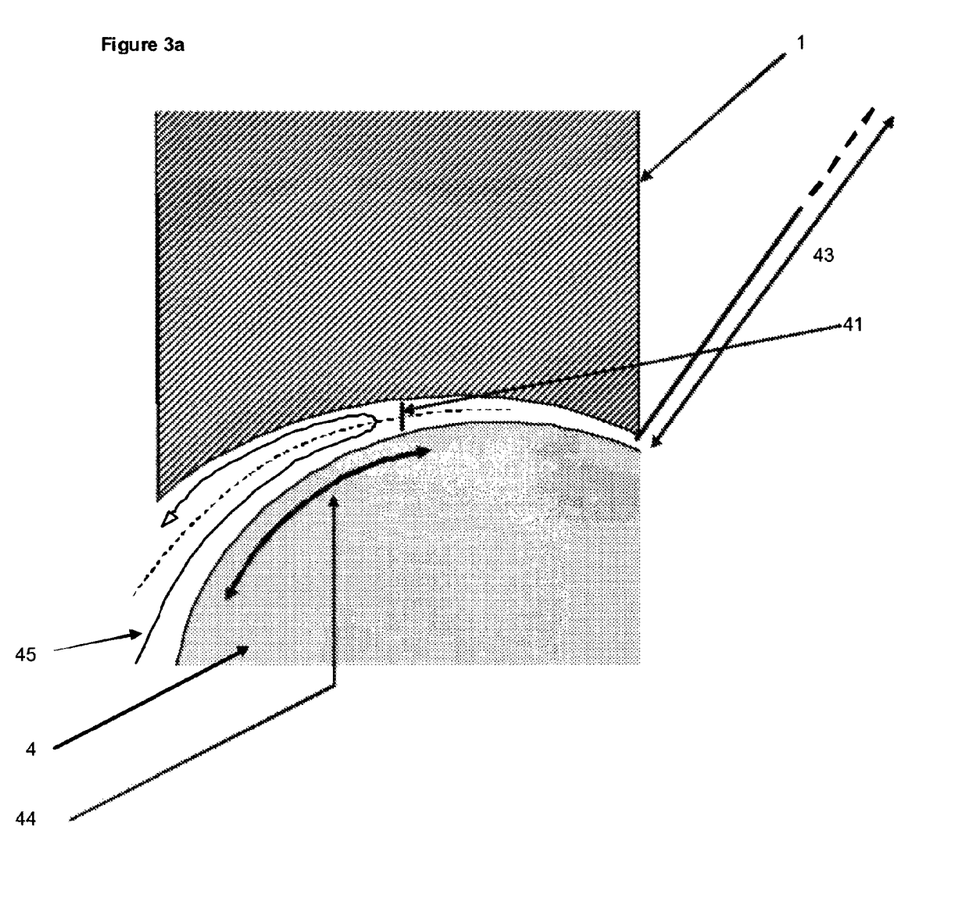
FIG. 3a illustrates the idealized flow profile entrained oil in the wedge formed just under the leading edge of the brush and the commutator.

Referring now to FIG. 3a, and assuming that the average height of the wedge 41 is h, it follows that the volume $V_s$ of the incoming 'stalled' fluid is:

$$V_s = d(h/2)w$$

where d defines a representative distance 44 under the wedge, w defines the width 43 of the brush and $v_a$ from Equation [3] is the average velocity of the oil 45 entering into the wedge.

The mass of oil is given approximately by:

$$M = \rho V_s,$$

where $\rho$ is the oil density.

The time for the oil to change velocity from $v_a$ to zero is given by:

$$T_d = d/v_a$$

Thus, the force F (rate of change of momentum) on the oil is given by:

$$F = Mv_d/T_d = M(v_a)^2/d \quad [4]$$

Because oil is an isotropic fluid and relatively incompressible, any force or equivalently any pressure acting upon it is measured to be the same in all directions. Thus the force that changed the momentum to zero can be translated to a force F that acts radially to the commutator, in effect causing a lifting pressure on the brush. From Equation [4] and various substitutions it can be shown that:

$$F = (\rho h w/2)(v_a)^2 \quad [5]$$

Substituting for $v_a$ into Equation [5] and simplifying yields:

$$F = (K)(w/h)(\rho)(\eta v_c)^2 \quad [6]$$

where we make the simplifying assumption that $r_a$ is equivalent to h/4 (as is evident from FIG. 3a) and K=8 $k^2$.

Thus Equation [6] predicts that the radial force that can potentially cause brush lift comprises a geometrical term, a term that depends linearly on density and a term that depends on the square of the viscosity and the commutator velocity. When the force due to the momentum change imposed on the oil by being made to change direction within the wedge between commutator and brush equals or exceeds the spring force (assuming the weight of the brush under gravity is negligible) then the phenomena of brush lift occurs. Laboratory experiments have confirmed the sensitivity of brush lift to the dimensions of the wedge (the geometrical term), the density of the oil and most importantly an approximately quadratic sensitivity to viscosity and rotational velocity.

Figure 4:
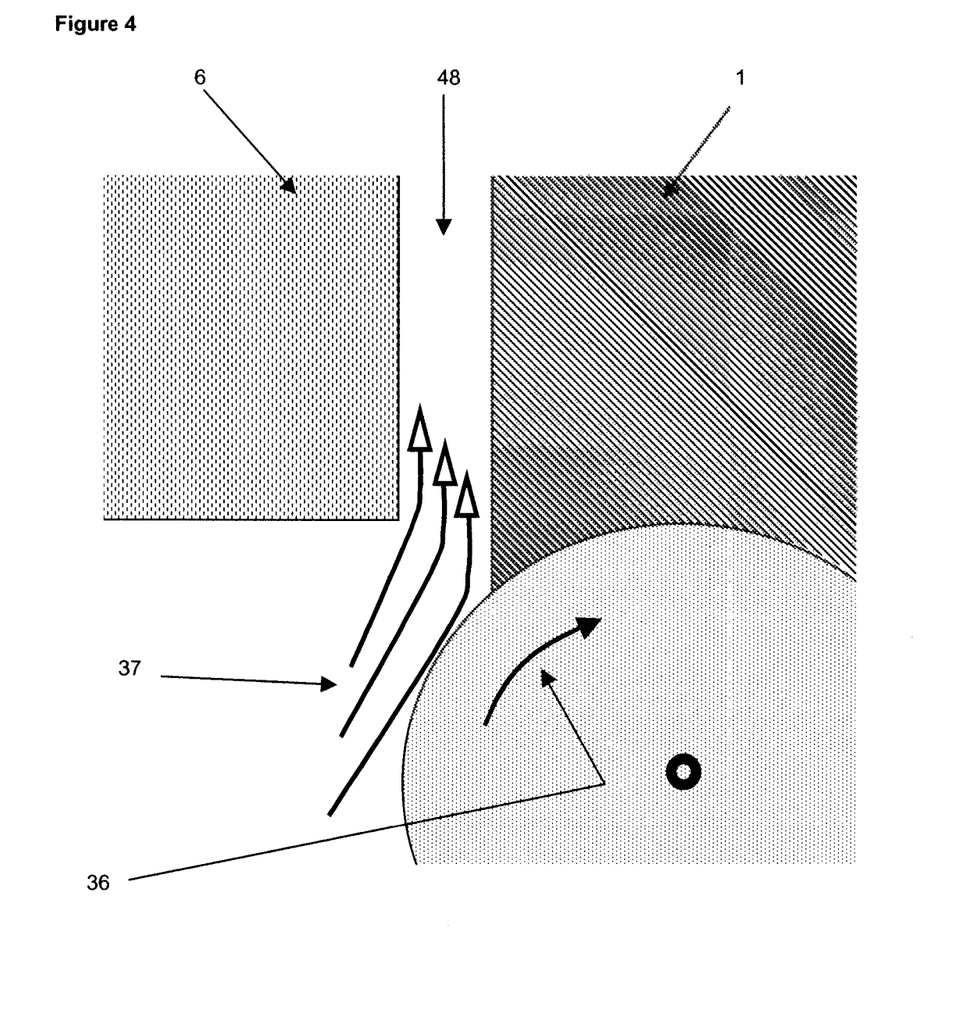
FIG. 4 is similar to FIG. 3, but has incorporated a representative pressure relief channel.
Figure 5:
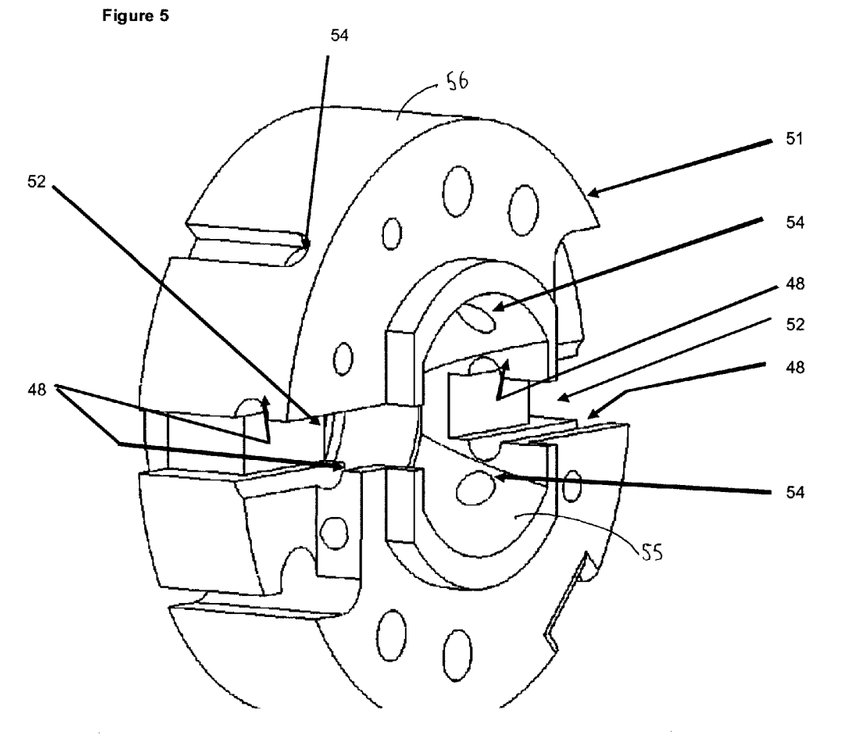
FIG. 5 is a perspective view of a housing showing pressure relief channels.

Given the present understanding that prior to brush-lift the pertinent forces on the brush are caused primarily by the fluid dynamically trapped under the leading edge of the brush being forced to radically change direction, the issue is what to do to reduce the radial force. In accordance with the present embodiment, reference to FIGS. 4 and 5 illustrates means to allow the majority of oil being swept round by the commutator 4 an alternative escape route rather than entering and then leaving the wedge, the alternative escape route in the present embodiment comprising a pressure relief channel or channels 48 immediately in front of the wedge. In the depicted embodiment the relief channel 48 comprises a groove in the form of an open-faced channel, which is discussed in more detail below in respect of FIG. 5 and which is conveniently placed in the housing 6. The relief channel 48 facilitates the modification of the oil flow profile 37 as shown in FIG. 4, whereby the majority of the entrained oil exits the housing 6 along the relief channel 48 without providing substantial momentum transfer under the brush 1, which would otherwise result in brush lift. The shape of relief channel 48 enables the majority of the flow just in front of the wedge to depart from tangential to radial streamline flow, thus avoiding a sharp change in direction underneath the brush 1.

Further benefits can be gained by providing additional pressure relief channels in the housing, as close as is practicable to the brushes 1. This is illustrated in FIG. 5, where a typical motor bell end housing 51 comprises a circular ring with an inner surface 55 and an outer surface 56. The inner surface 55 defines the oil-filled space 5 which receives the commutator 4. Brush-locating slots 52 extend from the inner surface 55 to the outer surface 56 of the housing 51 for receiving the brushes 1. Extending along either face of the brush-locating slot 52 are the open-faced or grooved pressure relief channels 48. By "open-faced channel" it is meant a channel through which fluid may flow from a first end to a second end and that is located along a surface of a body; the channel is not tunnelled through the body, but is instead open at least along a portion of its side such that the channel can be accessed via the open portion of its side in addition to the first and second ends. It will be noticed that the channels are on both the leading and trailing faces of the brush-locating slot 52 in this embodiment, to facilitate the reduction of brush lift when the motor is driven in the forward or reverse direction. Instead of becoming entrained in a wedge under the brush 1, the oil is instead diverted along the surface of the brush 1 and to the outer surface 56 of the housing 51, where the oil exits the housing 51.

A radial force due to the frictional drag of the oil on the brush 1 may now be present, but this effect can be offset by making the width of the channel 48 at least 25% to 35% of the width of the brush 1, and similarly at least 20% of the depth, thereby reducing the radial velocity of the oil to a relatively negligible value. Furthermore, the force applied to the brush 1 by the frictional drag of the oil is typically less than the radial force applied to the brush 1 in the prior art solution depicted in FIG. 2. The slots 12 in FIG. 2 allow oil to flow beneath and to apply force upwards on the brush 1 in a direction that is normal to the surface of the brush 1. Such forces typically exceed the aforedescribed frictional drag forces, which are applied in a direction parallel to the surface of the brush 1.

As depicted in FIG. 5, extra pressure relief channels 54 can be tunnelled or formed into the housing 51 and extend from the inner surface 55 to the outer surface 56 of the housing 51. As both the extra pressure relief channels 54 and the open-faced channels 48 extend along a vector that has a component perpendicular to the surface of the commutator 4, they are radially extending or disposed. In the embodiment shown the open-faced or grooved pressure relief channels 48 have a semi-circular cross section and the extra pressure relief channels 54 have a circular cross section; such cross sections are particularly expedient to produce by drilling. However a person of skill in the art will recognize that other cross-sectional shapes will also be suitable.

In an alternative embodiment, it is apparent that the pressure relief channels 48 could similarly be implemented in the brush 1 itself, resulting in equally beneficial effects.

Figure 6:
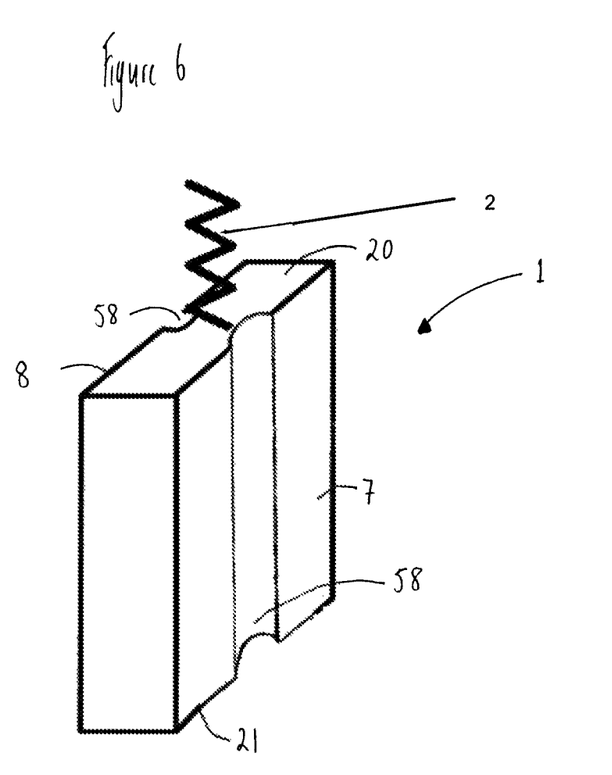
FIG. 6 is a perspective view of a brush showing pressure relief channels.

FIG. 6 depicts an embodiment in which the pressure relief channel is formed in the brush 1. In FIG. 6, the brush 1 comprises a first end 21 that contacts the rotating commutator 4 and an opposed second end 20 which is connected to the spring 2. Extending between the first and second end 21, 20 are four side faces. The brush 1 further comprises an open-faced or grooved pressure relief channel 58 extending along a leading face 7 of the brush from the first end 21 to the second end 20. The open-faced or grooved pressure relief channel 58 provides an exit route for the entrained oil gathered at the leading edge of the brush, which oil can be diverted out of the housing 51 to reduce or eliminate brush lift. An additional open-faced or grooved pressure relief channel 58 extends along a trailing face 8 of the brush from the first end 21 to the second end 20 to facilitate the reduction of brush lift when the motor is driven in the reverse direction. In the embodiment shown in FIG. 6 the open-faced or grooved pressure relief channels 58 have a semi-circular cross section, however a person of skill in the art will recognize that other cross-sectional shapes will also be suitable. For example, the relief channel can have square or rectangular cross-section with radiused internal corners. In this embodiment the pressure relief channels 58 are located on the center-line of the leading and trailing faces of the brush; however, one of skill in the art will also recognize that the open-faced pressure relief channel(s) 58 may be located at different positions on the brush 1 to that shown in FIG. 6 and still provide an escape route for entrained oil, thereby minimizing brush lift.

It will be apparent to one skilled in the art that FIG. 5 and FIG. 6 are intended only to illustrate exemplary embodiments; variation from these embodiments are possible. The present embodiments comprise means whereby the fluid can avoid momentum transfer into the brushes by providing a pressure relief channel that enables viscous fluid a direct means of exiting the housing along the direction of the brush, potentially reducing the brush lift due to the fluid being forced between the rotating commutator and its associated brushes. It is further understood that the dimensions of the pressure relief channel(s) are to be sufficient to effectively by-pass the viscous fluid without causing significant frictional drag of the fluid along the channel(s) for a given commutator's maximum rotational speed.

Figure 7:
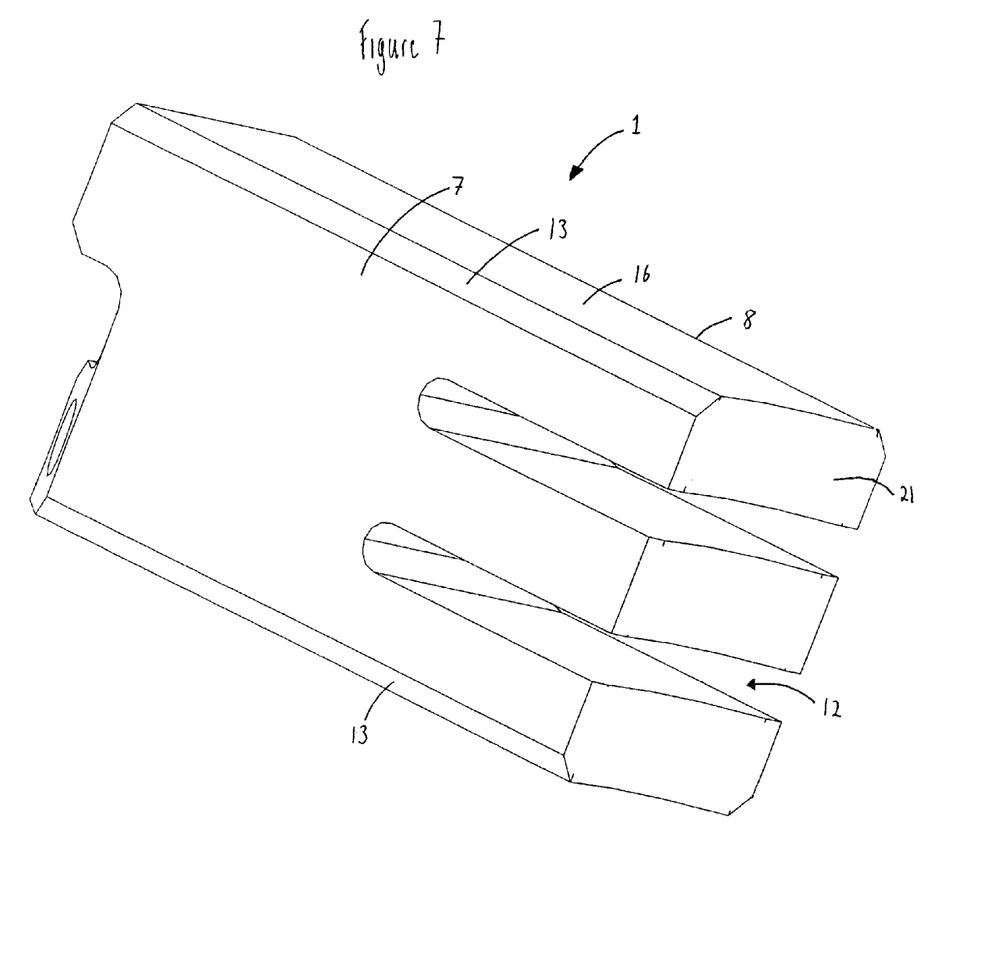
FIG. 7 is a perspective view of a brush incorporating two slots and having chamfered edges.

Another embodiment of a brush for use with an electric motor immersed in a fluid is illustrated in FIG. 7. The brush 1 has two bypass slots 12 cut into the first end 21 of the brush. The slots 12 extend toward but do not reach the second end 20 of the brush, such that the brush has three legs 16 as is provided in the prior art brush 1 shown in FIG. 2. In this embodiment the radially extending edges of the brush (i.e. the edges between the four side faces: leading face, trailing face and interconnecting lateral faces) are cut away to provide a chamfered or bevelled edge 13 along both edges of the leading face 7 and both edges of the trailing face 8. Although the brush 1 is shown in FIG. 6 with four chamfered edges, the brush 1 in an alternative embodiment can feature one, two or three radially extending chamfered edges 13, on the leading or trailing faces, or both. Or to put it another way, one or more of the edges between the four side faces can have a chamfered edge.

The chamfered edges 13 may be at 45 degrees to the faces of the brush, however other angles of chamfering may also be suitable. Without wishing to be bound by theory, it is believed that the chamfered edges 13 divert oil more efficiently than straight edges, reducing the build up of entrained oil at the leading edge of the brush, thereby minimizing brush lift. These chamfered edges provide the added benefit of avoiding presenting sharp corners of the brush, which can be prone to breaking when handled or during operation. In essence the chamfers serve as a open-faced channels on the edges of the brush, supplementing or substituting for the open-faced channel either in the housing or at the center of the brush as discussed in the previous embodiments. The chamfered edges also serve to make the brush profile more hydrodynamically efficient; without wishing to be bound by theory, it is theorized that if the brushes can cut through the oil more efficiently, there will be less pressure generated in the oil at the front of the brush, and thus less brush lift.

Figure 8:
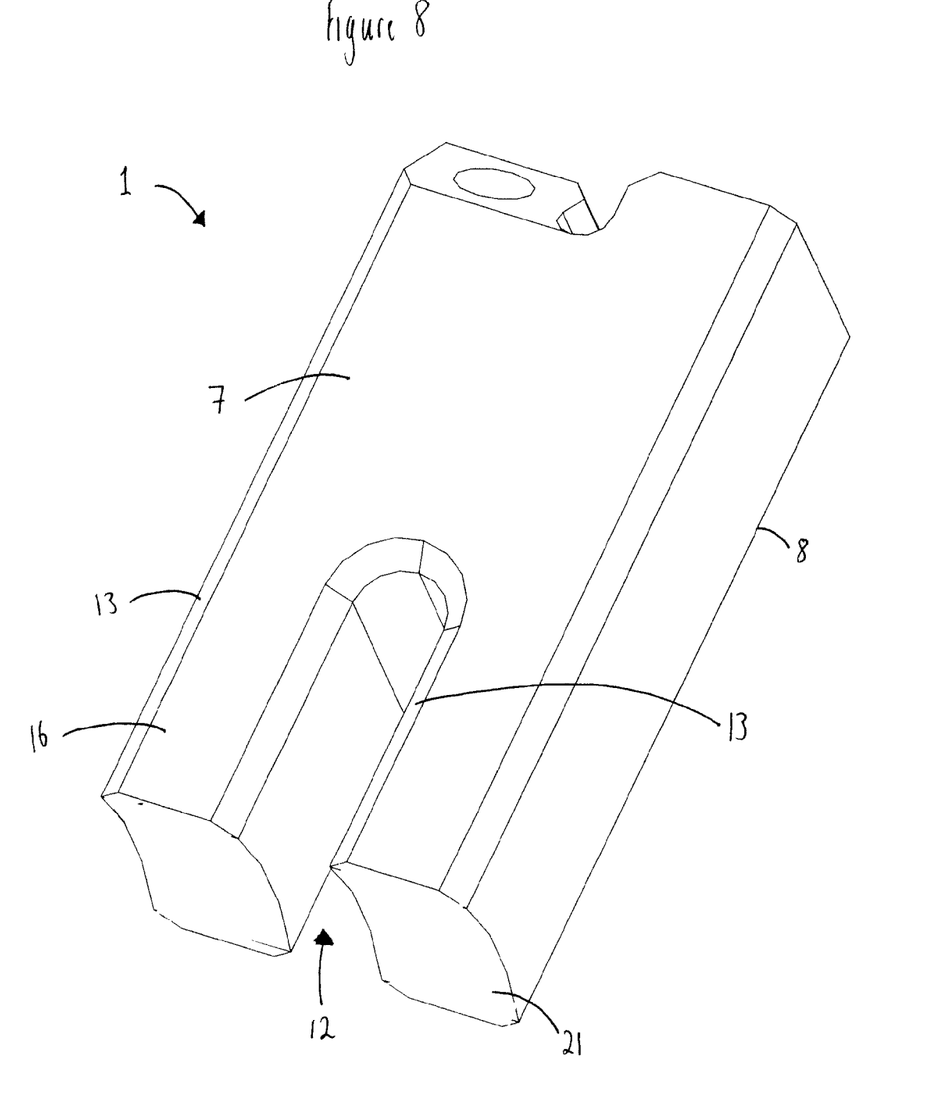
FIG. 8 is a perspective view of a brush incorporating one slot and having chamfered edges.

In an alternative embodiment as shown in FIG. 8, the brush 1 is provided with only one bypass slot 12. Provision of a single bypass slot 12 rather than two bypass slots 12 as is known in the prior art, allows the two legs 16 of the brush 1 either side of the single bypass slot 12 to be thicker, and therefore stronger and less prone to breaking, than the three legs 16 of the prior art brush 1 having two bypass slots 12. The edges of the brush, including the edges around the bypass slot 12 are chamfered or bevelled edges 13. As the two legs 16 of the brush of this embodiment can be thicker than the three legs 16 of known brushes, the width of the chamfered edges 13 can be greater whilst still maintaining adequate strength in the legs 16. Without wishing to be bound by theory, it is believed that a wider chamfered edge 13 will divert more oil, reducing the build up of entrained oil at the leading edge of the brush, thereby minimizing brush lift.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A brush and brush housing arrangement for use with an electric brushed motor containing viscous fluid, the brush and brush housing arrangement comprising a brush housing and at least one brush, the at least one brush comprising:
   a first end that is in contact with a rotating commutator of the motor when in use and an opposed second end; and
   at least one open-faced channel in a surface of the brush extending from the first end to the second end, such that the viscous fluid can be diverted from between the brush and the commutator and can exit the brush and brush housing arrangement via the open-faced channel;
   wherein the at least one open-faced channel comprises a first open-faced channel in the surface of a leading face of the brush.

2. The brush and brush housing arrangement of claim 1 wherein the at least one open-faced channel further comprises a second open-faced channel in the surface of a trailing face of the brush.

3. The brush and brush housing arrangement of claim 1 wherein the housing includes pressure relief means for allowing reduction of brush lift in the electric brushed motor.

4. A brush and brush housing arrangement for use with an electric brushed motor containing viscous fluid, the brush and brush housing arrangement comprising a brush housing and at least one brush, the at least one brush comprising:

a first end that is in contact with a rotating commutator of the motor when in use and an opposed second end; and at least one open-faced channel in a surface of the brush extending from the first end to the second end, such that the viscous fluid can be diverted from between the brush and the commutator and can exit the brush and brush housing arrangement via the open-faced channel;

wherein the housing comprises an inner surface which defines a space for receiving the commutator of the motor in the viscous fluid, an outer surface, and at least one brush-locating slot extending between the inner surface and the outer surface for receiving each of the at least one brush, the housing further comprising at least one pressure relief channel extending between the inner surface to the outer surface of the housing, such that the viscous fluid can be diverted from between the at least one brush and the commutator and can exit the brush and brush housing arrangement via the pressure relief channel.

5. The brush and brush housing arrangement of claim 4 wherein the at least one pressure relief channel comprises a first open-faced channel in a surface of the housing defining the at least one brush-locating slot immediately adjacent the leading face of the brush received in the brush-locating slot.

6. The brush and brush housing arrangement of claim 5 wherein the at least one pressure relief channel further comprises a second open-faced channel in a surface of the housing defining the at least one brush-locating slot immediately adjacent the trailing face of the brush received in the brush-locating slot.

7. The brush and brush housing arrangement of claim 4 further comprising at least one additional pressure relief channel extending between the inner surface and the outer surface of the housing and spaced from the at least one brush.

8. The brush and brush housing arrangement of claim 4 wherein the at least one pressure relief channel comprises a channel extending through the housing spaced from the at least one brush.

9. A brush and brush housing arrangement for use with an electric brushed motor containing viscous fluid, the brush and brush housing arrangement comprising a brush housing and at least one brush, the at least one brush comprising a first end that is in contact with a rotating commutator of the motor when in use, an opposed second end, and four side faces, wherein at least one edge between the side faces is chamfered and wherein the first end includes a single slot extending towards the second end, and wherein at least one edge of the slot is chamfered.

10. A brush for use with an electric brushed motor containing viscous fluid, the brush and electric brushed motor housed within a brush housing and comprising a brush and brush housing arrangement when in use, the brush comprising:

a first end that is in contact with a rotating commutator of the motor when in use and an opposed second end; and at least one open-faced channel in a surface of the brush extending from the first end to the second end, such that the viscous fluid can be diverted from between the brush and the commutator and can exit the brush and brush housing arrangement via the open-faced channel;

wherein the at least one open-faced channel comprises a first open-faced channel in the surface of a leading face of the brush.

11. The brush of claim 10 wherein the at least one open-faced channel further comprises a second open-faced channel in the surface of a trailing face of the brush.

12. A brush for use with an electric brushed motor containing viscous fluid, the brush comprising a first end that is in contact with a rotating commutator of the motor when in use, an opposed second end, and four side faces, wherein at least one edge between the side faces is chamfered, and wherein the first end includes a single slot extending towards the second end, and wherein at least one edge of the slot is chamfered.

13. A brush and brush housing arrangement for use with an electric brushed motor containing viscous fluid, the brush and brush housing arrangement comprising a brush housing and at least one brush, the at least one brush comprising a first end that is in contact with a rotating commutator of the motor when in use, an opposed second end, and four side faces, wherein at least one edge between the side faces is chamfered and wherein the first end includes at least two slots extending towards the second end, and wherein at least one edge of at least one of the slots is chamfered.

14. A brush for use with an electric brushed motor containing viscous fluid, the brush comprising a first end that is in contact with a rotating commutator of the motor when in use, an opposed second end, and four side faces, wherein at least one edge between the side faces is chamfered, and wherein the first end includes at least two slots extending towards the second end, and wherein at least one edge of at least one of the slots is chamfered.

* * * * *